(12) United States Patent
Nishida et al.

(10) Patent No.: US 8,649,949 B2
(45) Date of Patent: Feb. 11, 2014

(54) VEHICLE SHIFT CONTROL APPARATUS

(75) Inventors: Masayuki Nishida, Tokyo (JP); Hiroki Tanaka, Tokyo (JP); Takahito Morishita, Tokyo (JP); Keisuke Ajimoto, Tokyo (JP); Shinya Yasunaga, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/305,689

(22) Filed: Nov. 28, 2011

(65) Prior Publication Data

US 2012/0143451 A1   Jun. 7, 2012

(30) Foreign Application Priority Data

Dec. 6, 2010   (JP) ................. 2010-271647

(51) Int. Cl.
*G06F 7/00* (2006.01)
*G06F 17/00* (2006.01)
*G06F 19/00* (2011.01)

(52) U.S. Cl.
USPC ........................................... 701/52

(58) Field of Classification Search
USPC ........................................... 701/52
See application file for complete search history.

(56) References Cited

U.S. PATENT DOCUMENTS

| 8,068,963 B2* | 11/2011 | Sugiura et al. | 701/51 |
| 2005/0125134 A1* | 6/2005 | Iwatsuki et al. | 701/70 |
| 2005/0218718 A1* | 10/2005 | Iwatsuki et al. | 303/177 |

FOREIGN PATENT DOCUMENTS

| JP | 2006-097789 A | | 4/2006 |
| JP | 2007232093 A | * | 9/2007 |
| JP | 2010249177 A | * | 11/2010 |

OTHER PUBLICATIONS

Machine translation of JP 2007-232093 A, Mitsufuji, Sep. 2007.*
Machine translation of JP 2010-249177 A, Takeo, Nov. 2010.*

* cited by examiner

*Primary Examiner* — Mary Cheung
*Assistant Examiner* — Frederick Brushaber
(74) *Attorney, Agent, or Firm* — McGinn IP Law Group, PLLC

(57) ABSTRACT

In a vehicle shift control apparatus, a T/M_ECU has data of cancellation conditions stored therein in advance, which vary depending on modes of driving force characteristics and, in a temporary manual shift mode, selects a cancellation condition for the temporary manual shift mode which corresponds to a current mode and makes a determination as to whether the cancellation condition is satisfied. If it is determined that the cancellation condition for the temporary manual shift mode is satisfied, the T/M_ECU returns the temporary manual shift mode to the automatic shift mode.

16 Claims, 8 Drawing Sheets

Mpe1

Mpe2

Mpe3

VEHICLE SHIFT CONTROL APPARATUS

CROSS-REFERENCE TO RELATED APPLICATIONS

The present application claims priority from Japanese Patent Application No. 2010-271647 filed on Dec. 6, 2010, the entire contents of which are hereby incorporated by reference.

BACKGROUND OF THE INVENTION

1. Field of the Invention

The present invention relates to a vehicle shift control apparatus that is operable in a vehicle having a plurality of driving force modes in which an engine generates driving force in response to an accelerator operation and, for an automatic transmission, an automatic shift mode and a temporary manual shift mode in which a manual shift mode is temporarily used during driving in the automatic shift mode.

2. Description of the Related Art

Recently, automatic transmissions for a vehicle that are operable in a so-called temporary manual shift mode have been developed and practically used. The automatic transmission in such a mode allows a driver temporarily to perform an up-shift or a down-shift thereof by pressing an up-shift switch or a down-shift switch fitted in a steering wheel or the like with a select lever of the transmission being positioned in the drive (D) range. For example, Japanese Unexamined Patent Application Publication No. 2006-97789 discloses a shift control apparatus for a continuously variable transmission which is operable in; an automatic shift mode in which a gear ratio of the continuously variable transmission is automatically set; and a temporary manual shift mode in which a gear ratio of the continuously variable transmission can be selected from among a plurality of predetermined fixed gear ratios via the operation of a shift switch during driving in an automatic shift mode. When the temporary manual shift mode is switched to the automatic shift mode due to a cancel operation, the shift control apparatus sets a target speed of the engine on the basis of the driving condition of the vehicle and changes the gear ratio gradually at each calculation step so that the engine speed can change continuously to the targeted speed.

Meanwhile, there has been developed and practically used a vehicle that can be driven in a plurality of driving force modes in which the engine generates driving force in response to an accelerator operation. These driving force modes include a comfort-oriented and economy-oriented driving force mode and a sport-oriented and maneuverability-oriented driving force mode. When one of the modes is selected in order to satisfy driver's requirements, the engine is operated according to driving force characteristics corresponding to the selected mode. If a technology including a temporary manual shift mode such as disclosed in the Japanese Unexamined Patent Application Publication No. 2006-97789 is applied to such a vehicle having a plurality of driving force modes, shift characteristics are required that allow the vehicle to be driven under a driving condition desired by a driver.

SUMMARY OF THE INVENTION

The present invention has been achieved in light of the foregoing, and an object thereof is to provide a vehicle shift control apparatus that controls the temporary manual shift mode according to driving force characteristics selected by a driver and thereby makes a distinct difference among the driving force modes selected by the driver in order to improve convenience for the driver.

One aspect of the present invention provides a vehicle shift control apparatus that is operable in a vehicle having a plurality of driving force modes in which an engine generates driving force in response to an accelerator operation, and, as control modes of an automatic transmission connected to the engine, an automatic shift mode in which a gear ratio is automatically controlled according to predetermined shift characteristics and a temporary manual shift mode in which a gear ratio can be temporarily selected from among a plurality of predetermined fixed gear ratios through operation of a shift switch when driving is performed in the automatic shift mode. The vehicle shift control apparatus includes a cancellation condition storage unit that stores condition data for cancellation of the temporary manual shift mode which vary according to the plurality of modes, a cancellation condition determination unit that, in the temporary manual shift mode, selects a cancellation conditions for the temporary manual shift mode corresponding to a current mode and makes a determination as to whether the cancellation conditions are satisfied, and a control unit that returns the temporary manual shift mode to the automatic shift mode when the cancellation condition determination unit determines that the cancellation conditions for the temporary manual shift mode are satisfied.

DESCRIPTION OF THE PREFERRED EMBODIMENTS

An embodiment of the present invention is described below with reference to the attached drawings.

Figure 1:
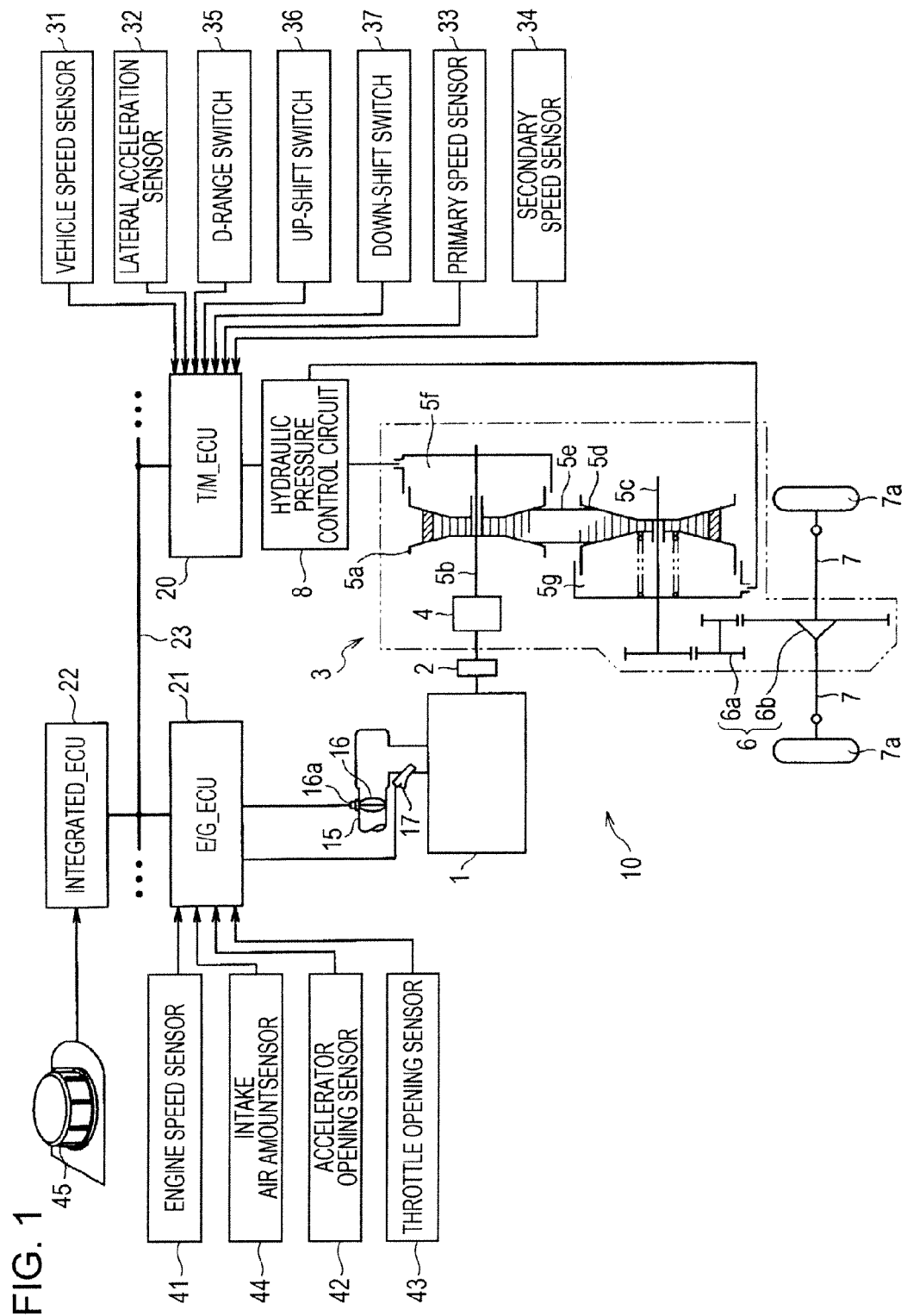
FIG. 1 is a diagram showing a schematic configuration of a power train mounted on a vehicle according to an embodiment of present invention.

In FIG. 1, reference numeral 1 denotes an engine. The engine 1 is main part of a power train 10 and connected to a continuously variable transmission 3, which is an example of an automatic transmission, via a starting clutch 2 such as an electromagnetic clutch and a torque converter.

The continuously variable transmission 3 has a forward-reverse changeover device 4 that is connected to the starting clutch 2, and a pulley input shaft 5b extending from the forward-reverse changeover device 4 pivotally supports a primary pulley 5a. In addition, a pulley output shaft 5c, which is arranged in parallel with the pulley input shaft 5b, pivotally supports a secondary pulley 5d. A drive belt 5e is mounted in such a manner as to be wrapped around the primary pulley 5a and the secondary pulley 5d. Furthermore, the pulley output shaft 5c is connected to a differential unit 6b via a reduction gear group 6a of a final reduction gear 6. The differential unit 6b is connected to a drive shaft 7 to which a front or rear drive wheel 7a is pivotally attached.

A primary hydraulic pressure chamber 5f is provided adjacent to the primary pulley 5a, and a groove width of the primary pulley 5a is adjusted through a primary hydraulic pressure supplied to the primary hydraulic pressure chamber 5f from a hydraulic pressure control circuit 8. On the other hand, a secondary hydraulic pressure chamber 5g is provided adjacent to the secondary pulley 5d, and a tensile force required for torque transmission is provided to the drive belt 5e through a secondary hydraulic pressure supplied to the secondary hydraulic pressure chamber 5g from the hydraulic pressure control circuit 8.

The hydraulic pressure control circuit 8 is controlled by a transmission control unit (T/M_ECU) 20 to be described later. The groove widths of the pulleys 5a and 5d are controlled through hydraulic pressure control so as to be inversely proportional to each other, thereby allowing the continuously variable transmission 3 to attain a desired transmission gear ratio.

The T/M_ECU 20 is connected to various control units such as an engine control unit (E/G_ECU) 21 and an integrated control unit (integrated_ECU) 22 through an in-vehicle communication line 23 such as a line using CAN (Controller Area Network) communication so as to allow communication therewith. Each of the ECUs 20 to 22 mainly includes a microcomputer that contains a CPU, a ROM, a RAM and a nonvolatile storage unit such as an EEPROM that are well known.

An input side of the T/M_ECU 20 is connected to a vehicle speed sensor 31 for detecting a vehicle speed V, a lateral acceleration sensor 32 for detecting a lateral acceleration Gy, a primary speed sensor 33 for detecting a speed (primary speed Np) of the primary pulley 5a, a secondary speed sensor 34 for detecting a speed (secondary speed Ns) of the secondary pulley 5d, a D-range switch 35 that is turned on when a vehicle driver sets a select lever of a transmission to a drive (D) range, and up-shift and down-shift switches 36 and 37 that are provided at vehicle driver's side to perform up/down shifting.

An output side of the T/M_ECU 20 is connected to an actuator such as the hydraulic pressure control circuit 8.

An input side of the E/G_ECU 21 is connected to various sensors such as an engine speed sensor 41 for detecting an engine speed Ne based on the rotation of a crankshaft, an accelerator opening sensor 42 for detecting an actual accelerator opening $\theta$acc based on the amount of depression of an accelerator pedal, a throttle opening sensor 43 for detecting an opening $\theta$th of an electronically controlled throttle valve 16 provided in an intake air passage 15, and an intake air amount sensor 44 that is disposed, for example, immediately downstream of an air cleaner and detects the amount of intake air.

An output side of the E/G_ECU 21 is connected to an injector 17 that injects a predetermined amount of fuel and an actuator that controls an engine operation, such as a throttle actuator 16a provided in the throttle valve 16.

An input side of the integrated_ECU 22 is connected to a mode selection switch 45 for selectively switching between control modes of driving force characteristics generated by the power train 10 in response to an accelerator operation.

In the present embodiment, the modes of driving force characteristics of the power train 10 include three kinds of mode M: normal mode M1, save mode M2, and power mode M3. The integrated_ECU 22 outputs mode information selected by a driver via the mode selection switch 45 to the T/M_ECU 20 and the E/G_ECU 21 through the in-vehicle communication line 23. The mode selection switch 45 according to the present embodiment uses a shuttle switch that has a push switch therein and automatically returns to the middle point. When the driver turns the switch counterclockwise, the normal mode M1 is confirmed. When the driver presses the switch, the save mode M2 is determined to selected. When the driver turns the switch to the right, the power mode M3 is determined to be selected.

Figure 5A:
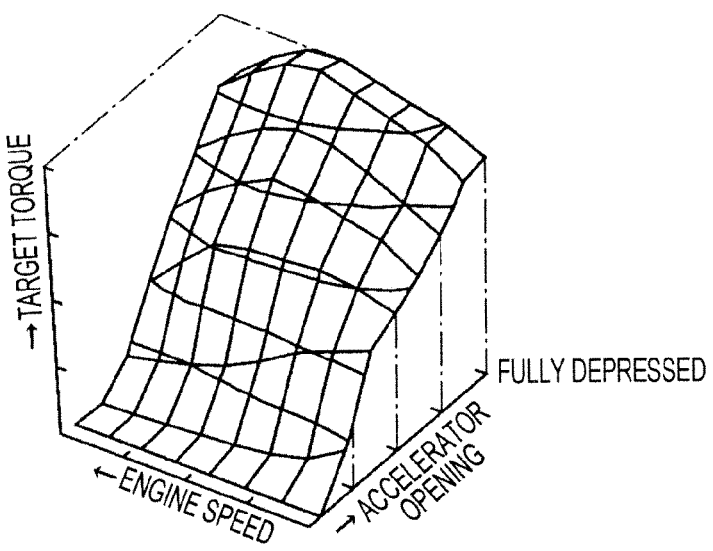
FIGS. 5A to 5C are conceptual diagrams showing a normal mode map, a save mode map, and a power mode map of an engine according to the embodiment of the present invention.
Figure 5B:
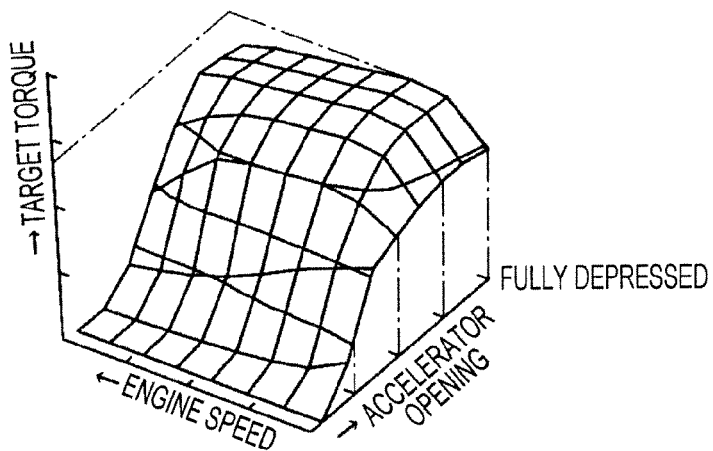
Figure 5C:
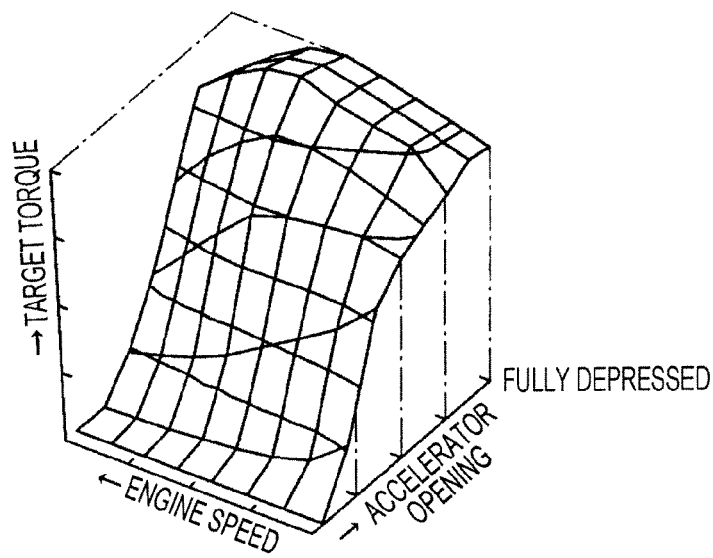

The E/G_ECU 21 has, for example, three mode maps Mpe1, Mpe2, and Mpe3 preset and stored in a memory thereof, which represent engine output characteristics. As shown in FIGS. 5A to 5C, each of the mode maps includes a three-dimensional map in which lattice axes represent accelerator opening $\theta$acc and engine speed Ne, and each lattice points stores an engine output instruction value (target torque).

The mode maps Mpe1, Mpe2 and Mpe3 are basically selected by the driver via the mode selection switch 45. In other words, the E/G_ECU 21 selects the normal mode map Mpe1 when the normal mode M1 is selected via the mode selection switch 45, the save mode map Mpe2 when the save mode M2 is selected, and the power mode map Mpe3 when the power mode M3 is selected.

On the basis of the selected mode map Mpe and detection signals from various sensors, the E/G_ECU 21 sets a fuel injection timing and a fuel injection pulse width (pulse time) for the injector 17. In addition, the E/G_ECU 21 outputs a throttle opening signal to a throttle actuator 16a, thereby controlling the opening of the throttle valve 16.

The normal mode map Mpe1 shown in FIG. 5A is configured to have target torque that linearly changes when the accelerator opening $\theta$acc is relatively small and reaches its maximum when the throttle valve 16 almost fully opens.

The save mode map Mpe2 shown in FIG. 5B is configured to place a particular emphasis on driving comfort and economy, in which a rise in target torque is suppressed, as compared to the normal mode map Mpe1, and the throttle valve 16 does not fully open even if the accelerator pedal is fully depressed. A change in opening of the throttle valve 16 is relatively smaller than that in the normal mode when the accelerator pedal is depressed. Accordingly, even if the accelerator pedal is depressed by a same amount as in the normal mode, the throttle opening $\theta$e remains small, which suppresses a rise in output torque. As a result, accelerator operations such as fully depressing the accelerator pedal can be enjoyed by causing the vehicle to be driven with the output torque suppressed according to the save mode map Mpe2. In addition, since a rise in target torque is suppressed, a good balance can be achieved between ease of driving and better fuel economy. For example, even a vehicle equipped with a 3-liter engine provides smooth and mild output characteristics while producing a sufficient output comparable to a 2-liter engine, in which the target torque is set in such a manner that importance is placed on ease of handling in a practical operating range, particularly, during city driving.

The power mode map Mpe3 shown in FIG. 5C places a particular emphasis on sport driving or maneuverability, and is configured to provide a greater rate of change in target torque in response to a change in the accelerator opening θacc over substantially the entire operating range. Accordingly, in case of a vehicle equipped with a 3-liter engine, the target torque is set so as to allow the 3-liter engine to provide its maximum potential.

The T/M_ECU 20 has, for example, automatic shift maps Mpt1 to Mpt3 (see FIG. 6) for automatically controlling the transmission gear ratio of the continuously variable transmission 3 according to the shift characteristics corresponding to the mode maps Mpe1 to Mpe3 described above and manual shift maps Mptm (see FIG. 7) for controlling the transmission gear ratio of the continuously variable transmission 3 to a fixed transmission gear ratio of a predetermined shift stage (for example, first to seventh shift stages), preset and stored in a memory thereof. On the basis of the selected shift map Mpt and detection signals from various sensors, the T/M_ECU 20 controls the transmission gear ratio of the continuously variable transmission 3 through the control of the hydraulic pressures to be supplied to the hydraulic pressure chamber 5f and the hydraulic pressure chamber 5g from the hydraulic pressure control circuit 8.

Among these maps, the automatic shift maps Mpt1 to Mpt3 are used on a selective basis, depending on the mode M selected via the mode selection switch 45, when the drive range is selected via the D-range switch 35, and the continuously variable transmission 3 is set to the automatic shift control mode. In other words, the T/M_ECU 20 selects the automatic shift map Mpt1 when the normal mode M1 is selected through the mode selection switch 45, the automatic shift map Mpt2 when the save mode M2 is selected, and the automatic shift map Mpt3 when the power mode M3 is selected in order to comply with the mode maps Mpe of the engine 1, respectively. Then, by making reference to the thus selected automatic shift map Mpt, the T/M_ECU 20 sets a target primary speed Npt based on a current vehicle speed V and an accelerator opening θacc and thereby controls the transmission gear ratio in such a manner that the primary speed Np matches the target primary speed Npt.

Figure 6:
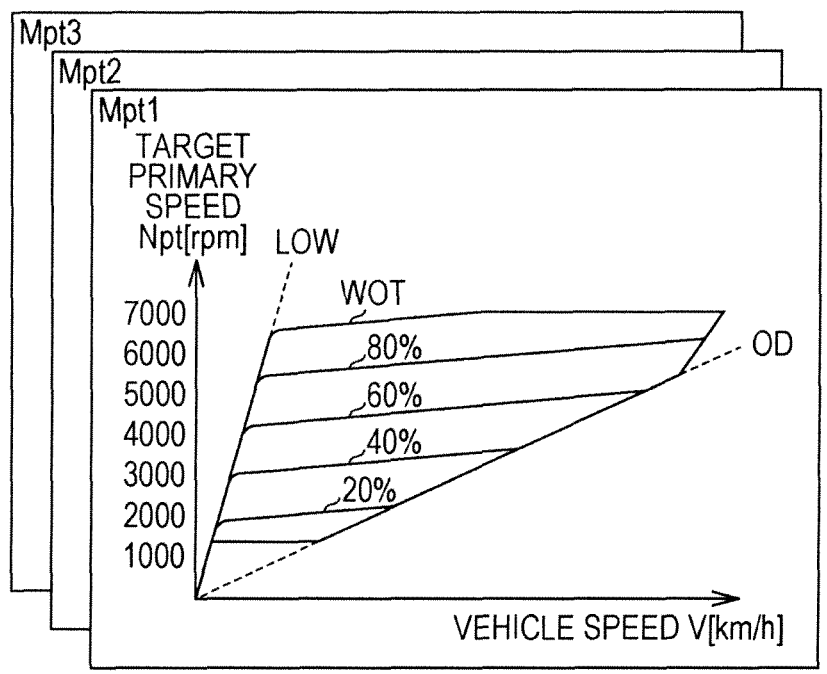
FIG. 6 is a diagram showing shift characteristics in an automatic shift mode according to the embodiment of the present invention.

As shown in, for example, FIG. 6, each of the automatic shift maps Mpt1 to Mpt3 includes a map where a shift characteristic line showing the relationship between the vehicle speed V and the target primary speed Npt is set for each accelerator opening θacc between a maximum transmission gear ratio LOW and a minimum transmission gear ratio OD (overdrive). In this case, in order to comply with the mode maps Mpe1 to Mpe3 for the engine output characteristics described above, the shift characteristic lines on the automatic shift maps Mpt1 to Mpt3 are basically set so as to calculate a target primary speed Np at which the shift characteristic line for the mode M2 is relatively lower than the shift characteristic line for the mode M1 and to calculate a target primary speed Np at which the shift characteristic line for the mode M3 is relatively higher than the shift characteristic line for the mode M2 under the same vehicle speed V and accelerator opening θacc.

With this setting, a proper shift control is performed on the basis of the output characteristics of the engine 1 in an automatic shift mode in which the drive range is selected via the D-range switch 35, thereby allowing the power train 10 to produce a characteristic driving force for each of the modes selected via the mode selection switch 45.

Figure 7:
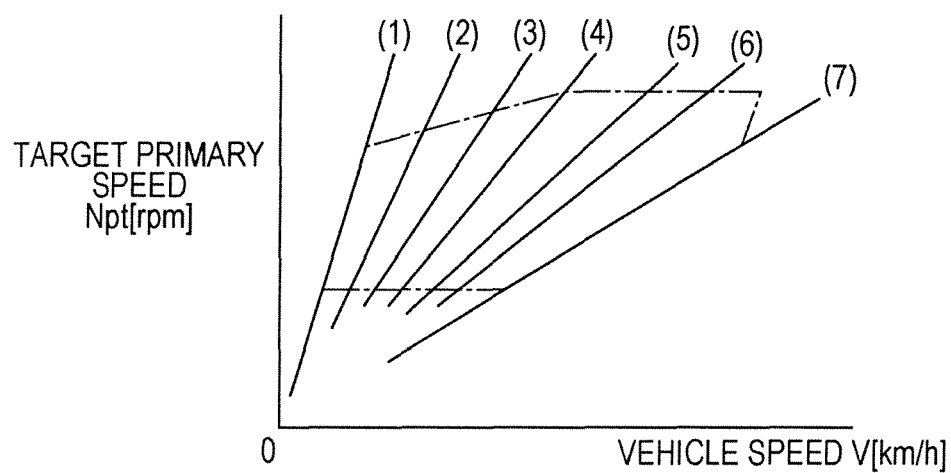
FIG. 7 is diagram showing shift characteristics in a manual shift mode and a temporary manual shift mode according to the embodiment of the present invention.
Figure 8A:
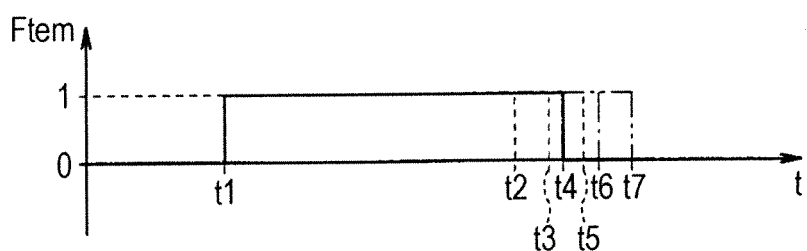
FIGS. 8A to 8D are timing charts illustrating a difference among first cancellation conditions according to the embodiment of the present invention.
Figure 8B:
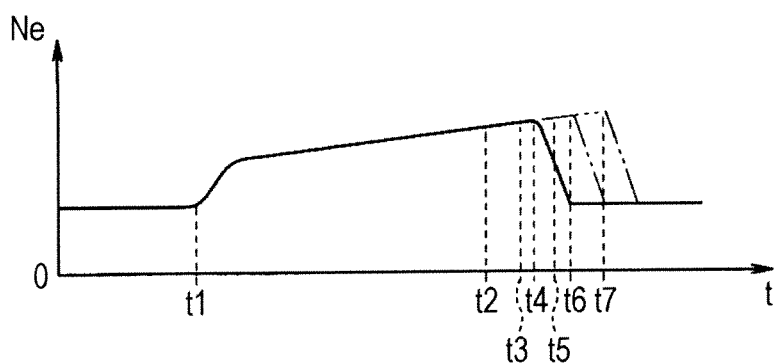
Figure 8C:
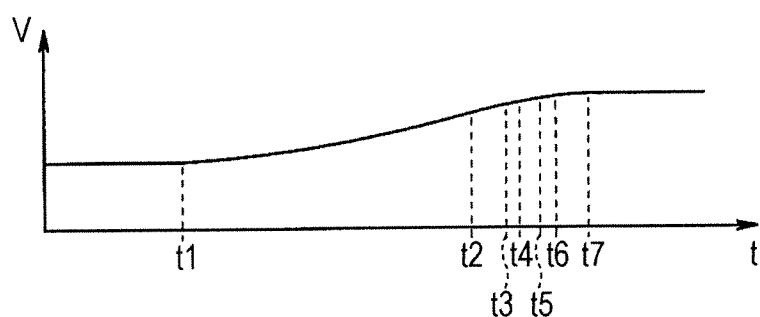
Figure 8D:
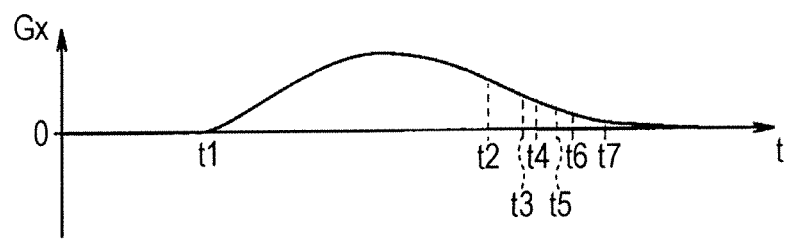
Figure 9A:
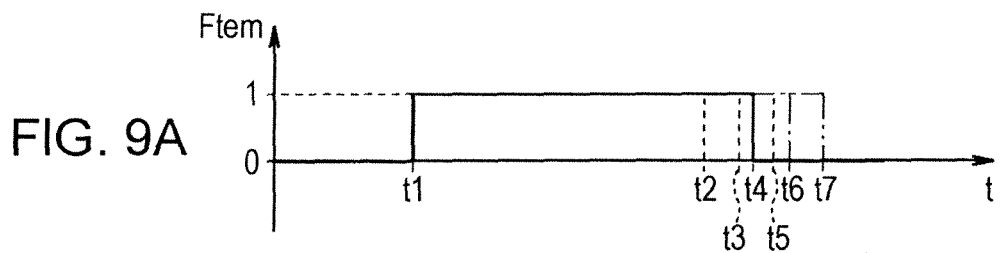
FIGS. 9A to 9E are timing charts illustrating a difference among second cancellation condition according to the embodiment of the present invention.
Figure 9B:
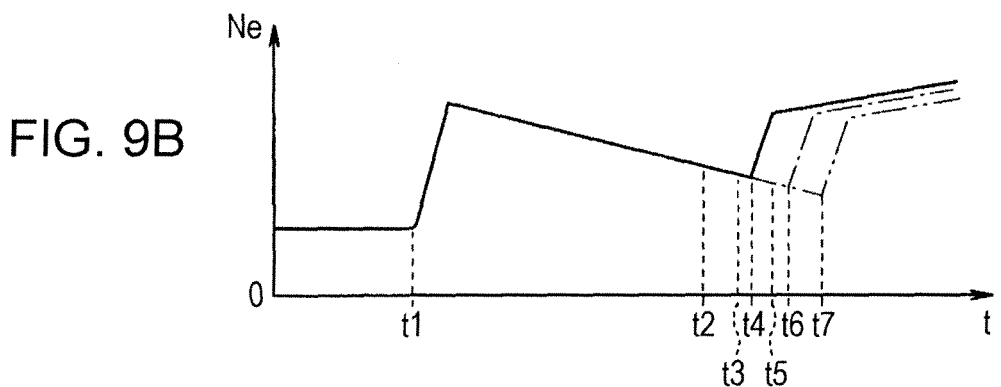
Figure 9C:
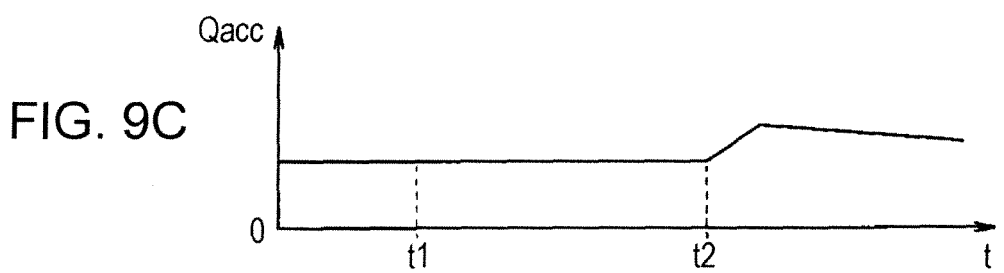
Figure 9D:
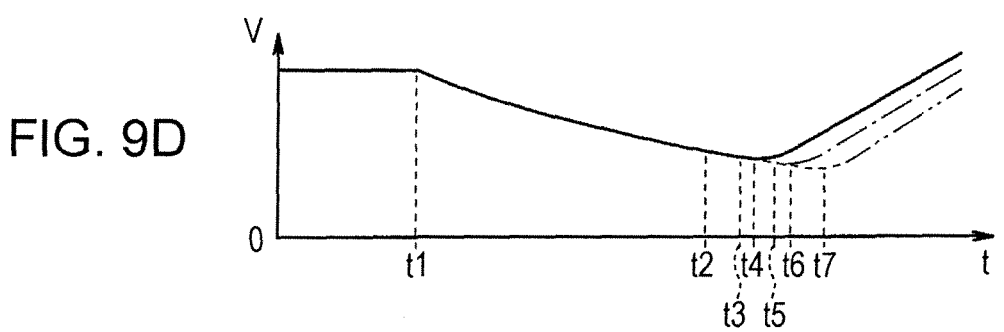
Figure 9E:
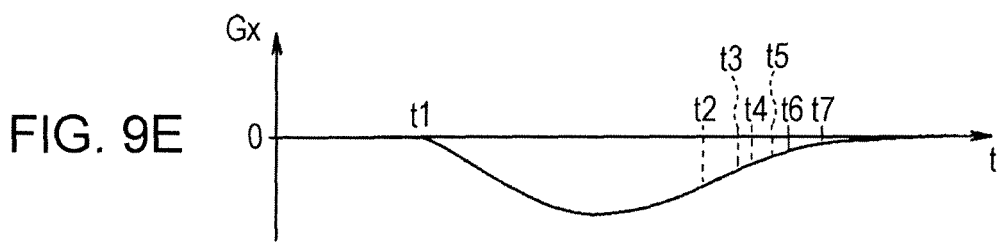

As shown in FIG. 7, when the temporary manual shift mode is selected in the automatic shift mode through the operation of the up-shift switch 36 or the down-shift switch 37, a transmission gear ratio i is set to one of values that are fixed in a step-like pattern (fixed transmission gear ratio) as is the case with an ordinary multi-stage transmission such as a 7-speed transmission. When the up-shift switch 36 is turned on in the automatic shift mode, the current transmission gear ratio is set to a nearest fixed gear ratio on the up-shift side. On the other hand, when the down-shift switch 37 is turned on, the current transmission gear ratio is set to a nearest fixed gear ratio on the down-shift side. In addition, when the up-shift switch 36 or the down-shift switch 37 is turned on again, the fixed gear ratio is sequentially up-shifted or down-shifted from among the seven-step gear ratios indicated by (1) to (7) of FIG. 7, every time the driver turns on the up-shift switch 36 or the down-shift switch 37. The seven-step gearshift of FIG. 7 is shown as an example. Fixed gear ratios corresponding to a five-step, six-step, or other multi-step gearshift other than the seven-step gearshift may be used.

The T/M_ECU 20 has cancellation conditions for the temporary manual shift mode stored in advance therein, which vary in accordance with the mode M for driving force characteristics described above. Such cancellation conditions for the temporary manual shift mode are based on a determination as to whether, for example, a vehicle is traveling substantially at a constant speed, as shown below.

First Cancellation Conditions (Cancellation Conditions for Normal Operating State)

For the normal mode M1 of the driving force characteristics: The cancellation conditions are satisfied if acceleration falls within, for example, +/−0.04 m/s$^2$ for a predetermined duration Tc.

For the save mode M2 of the driving force characteristics: The cancellation conditions are satisfied if acceleration falls within, for example, +/−0.05 m/s$^2$ for the predetermined duration Tc.

For the power mode M3 of the driving force characteristics: The cancellation conditions are satisfied if acceleration falls within, for example, +/−0.03 m/s$^2$ for the predetermined duration Tc.

As described above, in the present embodiment the cancellation conditions for the temporary manual shift mode are most likely to be satisfied in the save mode M2 of the driving force characteristics, while the cancellation conditions for the temporary manual shift mode are most unlikely to be satisfied in the power mode M3 of the driving force characteristics. Since the driver desires comfort-oriented and economy-oriented driving when selecting the save mode M2, the save mode M2 is set so as to extend an automatic shift region to meet the driver's requirement, thereby achieving a good balance between fuel economy and comfort.

Second Cancellation Conditions (Cancellation Conditions Set at the Time of Transition (Determined Based on a Lateral Acceleration Gy Value or the Like) from Traveling on a Curved Section of Road to Traveling on a Straight Section of Road Following Down-Shifting)

For the normal mode M1 of the driving force characteristics: The cancellation conditions are satisfied if acceleration falls within, for example, +/−0.04 m/s$^2$ for a predetermined duration Tc.

For the save mode M2 of the driving force characteristics: The cancellation conditions are satisfied if acceleration falls within, for example, +/−0.03 m/s$^2$ for the predetermined duration Tc.

For the power mode M3 of the driving force characteristics: The cancellation conditions are satisfied if acceleration falls within, for example, +/−0.05 m/s$^2$ for the predetermined duration Tc.

As described above, if the vehicle is considered to be in a transition from traveling on a curved section of a road to traveling on a straight section thereof following down-shifting, the cancellation conditions for the temporary manual shift mode are most likely to be satisfied in the power mode M3 of driving force characteristics, while the cancellation conditions for the temporary manual shift mode are most unlikely to be characteristics in the save mode M2 of the driving force characteristics. Since the driver desires sport-oriented and maneuverability-oriented driving when selecting the power mode M3, the power mode M3 is set so as to return the vehicle to the automatic shift mode soon after, for example, the driver down-shifts to slow down the vehicle through engine braking before entering a corner and then depresses the accelerator pedal when exiting the corner, thereby providing a more improved accelerating performance due to down-shifting.

The acceleration ranges indicated in the conditions above are shown as an example of determination as to whether a vehicle is being driven substantially at a constant speed, and the present invention is not limited to these. Such determination as to whether a vehicle is being driven substantially at a constant speed may use, for example, the accelerator opening θacc in addition to acceleration. If the accelerator opening θacc is used, acceleration of +/−0.03 m/s$^2$ as the narrowest range corresponds to 8 to 12 degrees, while acceleration of +/−0.05 m/s$^2$ as the widest range corresponds to 5 to 15 degrees. In addition, acceleration of +/−0.04 m/s$^2$ as the middle range corresponds to 6.5 to 13.5 degrees. Although the first and second cancellation conditions are provided for the temporary manual shift mode in the present embodiment, one set of cancellation conditions may be used depending on vehicle specifications or target customers of a vehicle. In other words, the cancellation conditions for the temporary manual shift mode may be most likely to be satisfied for the save mode M2 (M3) of the driving force characteristics and the cancellation conditions for the temporary manual shift mode may be most unlikely to be satisfied for the power mode M3 (M2) of the driving force characteristics.

When, while the vehicle is being driven in the automatic shift mode, the driver turns on the up-shift switch 36 or the down-shift switch 37 to switch the shift mode to the temporary manual shift mode, the T/M_ECU 20 performs manual shift control for up-shifting or down-shifting the fixed gear ratio according to the turn-on operation of the up-shift switch 36 or the down-shift switch 37 and at the same time loads the cancellation conditions for the temporary manual shift mode corresponding to the current mode M of the driving force characteristics in order to determine the cancellation conditions for returning the shift mode to the automatic shift mode on the basis of parameters (acceleration or accelerator opening) that indicate the operating status. Then, when the cancellation conditions are satisfied, the shift mode is automatically returned to the automatic shift mode.

As described above, the T/M_ECU 20 function as a cancellation condition storage unit, a cancellation condition determination unit, and a control unit.

Figure 2:
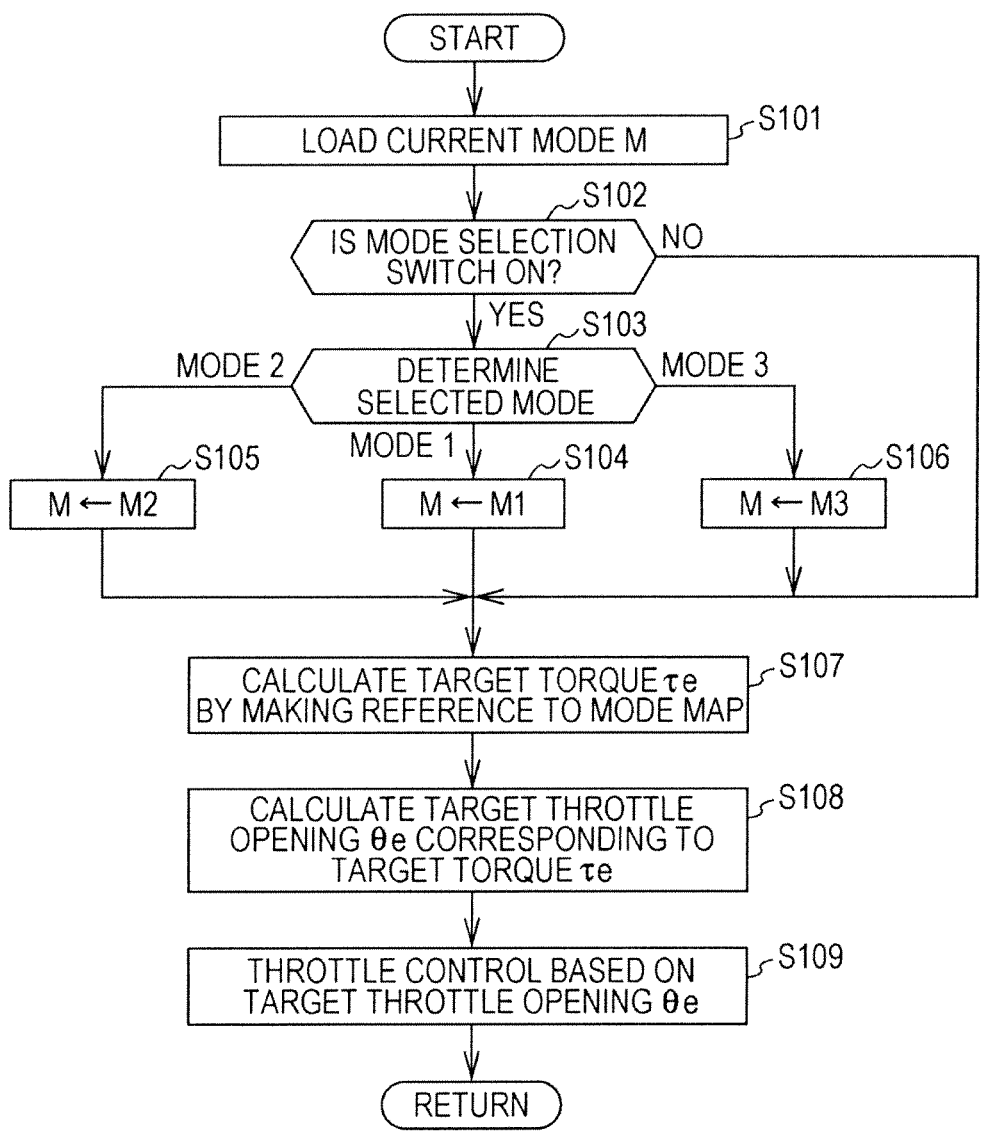
FIG. 2 is a flowchart showing engine throttle control according to the embodiment of present invention.

Next, engine throttle control performed by the E/G_ECU 21 is described below based on a flowchart for a throttle control routine shown in FIG. 2. Such a routine is executed at every set time. If the routine starts, the E/G_ECU 21 loads a currently set mode M in step (hereinafter referred to as "S") 101 and proceeds to S102.

When the flow proceeds to S102 from S101, the E/G_ECU 21 makes a determination as to whether or not the mode selection switch 45 is turned on. When it is determined that the mode selection 45 switch is not turned on, the flow proceeds to S107.

When it is determined in S102 that the mode selection switch 45 is turned on, the E/G_ECU 21 proceeds to S103 where it makes a determination as to which mode the driver has selected.

When it is determined in S103 that the driver has selected the normal mode M1, the E/G_ECU 21 proceeds to S104 where it sets the mode M to the normal mode M1 (M←M1) and proceeds to S107.

When it is determined in S103 that the driver has selected the save mode M2, the E/G_ECU 21 proceeds to S105 where it sets the mode M to the save mode M2 (M←M2) and proceeds to S107.

When it is determined in S103 that the driver has selected the power mode M3, the E/G_ECU 21 proceeds to S106 where it sets the mode M to the power mode M3 (M←M3) and proceeds to S107.

When the flow proceeds to S107 from S102, S104, S105, or S106, the E/G_ECU 21 loads a mode map Mpe corresponding to the currently selected mode M and determines a target torque Te by making reference to the mode map Mpe with interpolation calculation based on the current engine speed Ne and the accelerator opening θacc.

Then, the flow proceeds to S108 where the E/G_ECU 21 determines a target throttle opening θe corresponding to the target torque τe. Then in following S109 the E/G_ECU 21 performs feedback control for the throttle actuator 16a in such a manner that the throttle opening θth matches the target throttle opening θe. Then the routine is exited.

Consequently when the driver depresses the accelerator pedal, the throttle valve 16 is opened or closed on the basis of the parameters including the accelerator opening θacc and the engine speed Ne according to the mode M selected by the driver, thereby allowing the engine 1 to be operated so as to provide output characteristics that vary according to the mode M.

Figure 3:
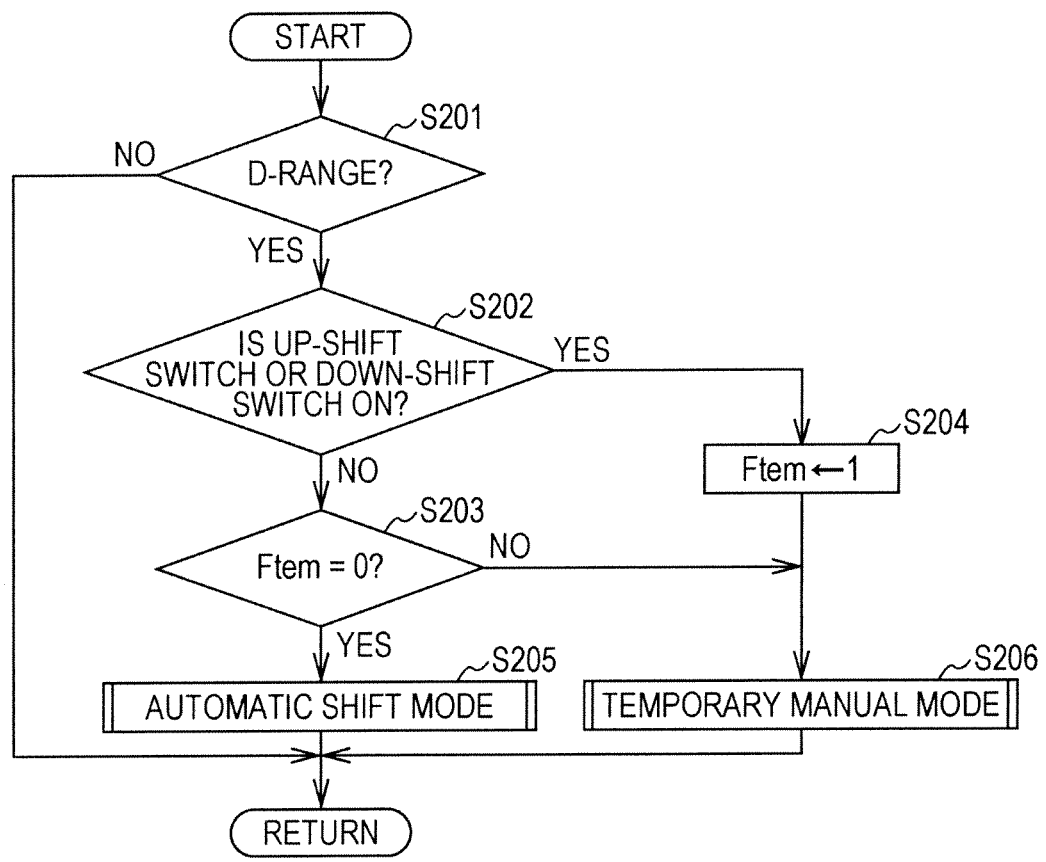
FIG. 3 is a flowchart showing a shift mode switching control routine according to the embodiment of present invention.
Figure 4:
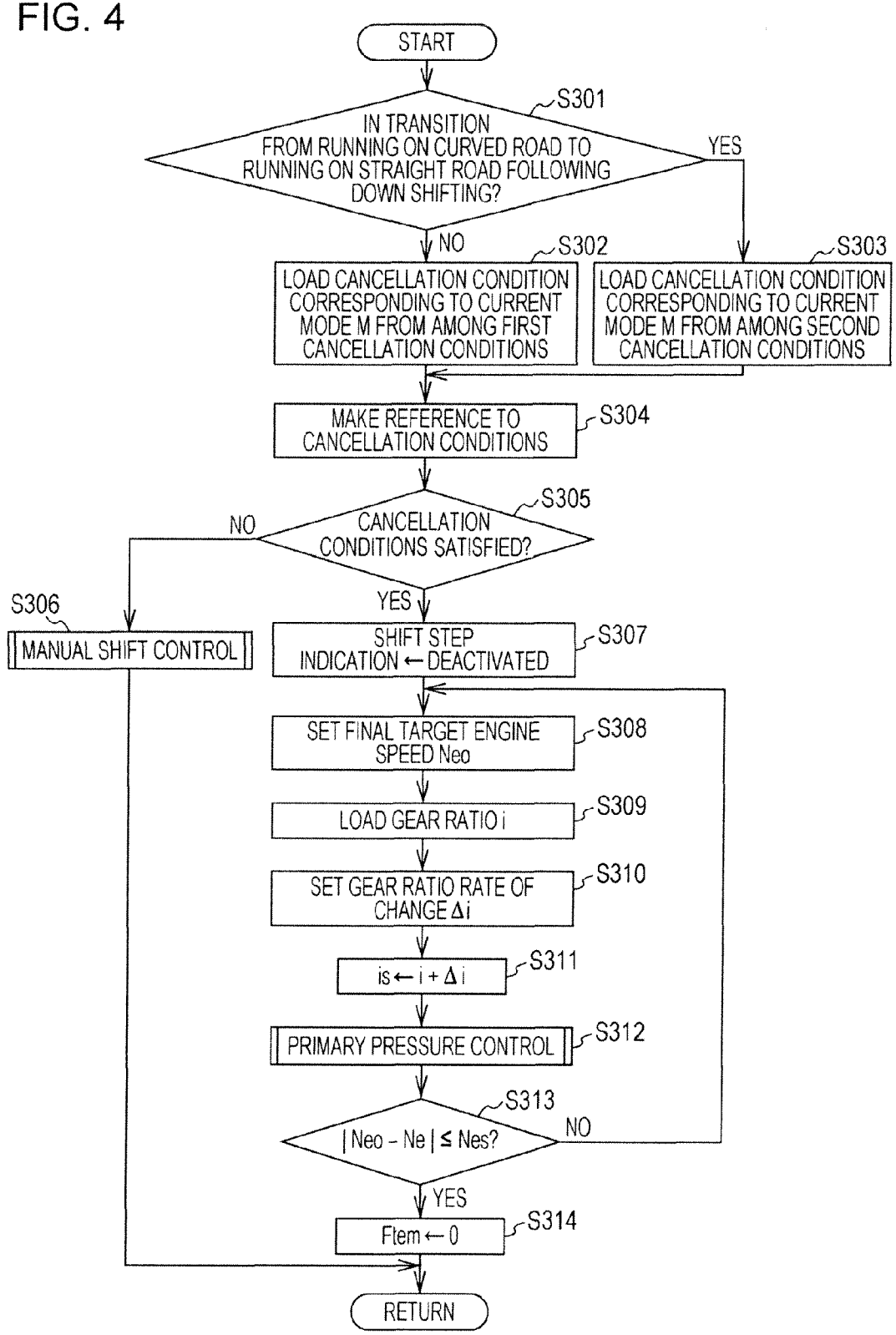
FIG. 4 is a flowchart showing a temporary manual shift mode control routine according to the embodiment of present invention.

Next, shift mode switching control and temporary manual shift mode control that are executed by the T/M_ECU 20 are explained according to flowcharts shown in FIGS. 3 and 4.

FIG. 3 shows a shift mode switching control routine. The routine is executed at every predetermined interval following starting of the engine. First, a determination is made in S201 based on the output of the D-range switch 35 as to whether the select lever of the transmission is placed in the D-range. If it is determined that the select lever is in the D-range, the process flow proceeds to S202. If the select lever is not in the D-range, the routine is exited.

When it is determined that the select lever is placed in the D-range, the process flow proceeds to S202 where a determination is made as to whether the up-shift switch 36 or the down-shift switch 37 is in the on position. If it is determined that neither of the two shift switches is in the on position, the process flow proceeds to S203 where a determination is made as to whether or not a temporary mode determination flag Ftem is cleared. If it is determined that the temporary mode determination flag Ftem is cleared (Ftem=0), the process flow proceeds to S205 where driving is performed in a usual automatic shift mode. Then the routine is exited.

As described above, in the automatic shift mode the automatic shift map Mpt1 is selected when the normal mode M1 is selected through the mode selection switch 45, the automatic shift map Mpt2 is selected when the save mode M2 is selected, and the automatic shift map Mpt3 is selected when the power mode M3 is selected in order to comply with the mode maps Mpe of the engine 1, respectively. Then, by making reference to the thus selected automatic shift map Mpt, the T/M_ECU 20 sets a target primary speed Npt based on a current vehicle speed V and an accelerator opening θacc and thereby controls the transmission gear ratio in such a manner that the primary speed Np matches the target primary speed Npt.

If the temporary mode determination flag Ftem is set in S203 (Ftem=1), it is determined that either one of the two shift switches 36 and 37 is turned on in the previous routine execution and accordingly operation in the temporary manual shift mode is continued, causing the process flow to skip to S206. The temporary mode determination flag Ftem has a default value of "0". It is set in S204 to be described later and is cleared in S314 of the flowchart shown in FIG. 4.

If it is determined in S202 that either one of the two shift switches 36 and 37 is in the on position, the process flow proceeds to S204 where the temporary mode determination flag Ftem is set (Ftem←1) and then proceeds to S206.

The process flow proceeds from S203 or S204 to S206 where the temporary manual shift mode is executed. Then the routine is exited. Operation in the temporary manual shift mode executed in S206 is processed according to the temporary manual shift mode control routine shown in FIG. 4.

In this routine, firstly a determination is made in S301 as to whether the vehicle is in a transition from traveling on a curved section of a road to traveling on a straight section thereof following down-shifting (for example, when the absolute value of lateral acceleration changes from a larger one to a smaller one).

If it is determined in S301 that the vehicle is not in a transition from traveling on a curved section of a road to traveling on a straight section thereof following down-shifting, the process flow proceeds to S302 where a cancellation condition according to the current mode M is loaded from among the first cancellation conditions for the temporary manual shift mode, and proceeds to S304.

If it is determined in S301 that the vehicle is in a transition from traveling on a curved section of a road to traveling on a straight section thereof following down-shifting, the process flow proceeds to S303 where a cancellation condition according to the current mode M is loaded from among the second cancellation conditions for the temporary manual shift mode, and proceeds to S304.

The process flow proceeds from S302 or S303 to S304 where the loaded cancellation condition is referred to.

Then, the process flow proceeds to S305 where a determination is made as to whether or not the cancellation condition for the temporary manual shift mode is satisfied. If it is determined that the cancellation condition is not satisfied, the process flow proceeds to S306 where the manual shift control is performed. Then the routine is exited. In the manual shift control, the transmission gear ratio i based on the primary speed Np and the secondary speed Ns (i=Np/Ns) is fixed in a step-like pattern as is the case with an ordinary multi-stage transmission. In the first routine at the time of a transition from the automatic shift mode to the manual shift control, when the up-shift switch 36 is turned on, the current gear ratio i is set to a nearest fixed gear ratio on the up-shift side. On the other hand, when the down-shift switch 37 is turned on, the current gear ratio i is set to a nearest fixed gear ratio on the down-shift side. In execution of the second and subsequent routines, the fixed gear ratio is sequentially up-shifted or down-shifted every time the up-shift switch 36 or the down-shift switch 37 is turned on.

If it is determined in S305 that the cancellation condition is satisfied, the process flow proceeds to S307. In S307 and subsequent steps, shift control for transition to the automatic shift mode is performed.

First, in S307 a shift step indicated in an unillustrated shift step indicator is deactivated. Next, in S308 an automatic shift map corresponding to the current mode M is selected from among the automatic shift maps Mpt1 to Mpt3, and by making reference to the thus selected map a final target engine speed Noe is set as a final target value for transition to the automatic shift mode on the basis of the throttle opening θth and the vehicle speed V.

In this case, a final target gear ratio may be set instead of the final target engine speed Noe. In addition, a final turbine speed of a torque converter may be set for vehicles that employ the torque converter as the starting clutch 2.

Next, the process flow proceeds to S309 where a current gear ratio i (i=Np/Ns) is loaded, and in S310 a gear ratio rate of change Δi is set at every calculation interval.

Such a gear ratio rate of change Δi is set lower than the gear ratio rate of change to be set when the ordinary manual shift mode is intentionally returned by the driver to the automatic shift mode, namely, when shifting to the ordinary manual shift mode is performed by turning on an unillustrated manual switch and then the select lever of the transmission is returned.

Although the gear ratio rate of change Δi is a fixed value in the present embodiment, it may be a variable value to be set by, for example, making reference to a map based on parameters including the engine speed Ne and the throttle opening θ or by calculation. Alternatively, it may be a variable value to be set by making reference to a map based on the final target engine speed Neo or calculation.

Next, the process flow proceeds to S311 where the gear ratio rate of change Δi is added to the gear ratio i loaded in S309 to set a target gear ratio is, and proceeds to S312 where the primary pressure control is performed by outputting a signal to the hydraulic pressure control circuit 8 so that an actual gear ratio i matches the target gear ratio is.

Next, the process flow proceeds to S313 where a determination is made as to whether or not an absolute value (|Neo−Ne|) of a difference between the final target engine speed Neo and the engine speed Ne detected by the engine speed sensor 41 falls within a set range Nes. If it is determined that the absolute value does not fall within the set range Nes (|Neo−Ne|>Nes), the process flow returns to S308 where the final target engine speed New is again set.

If the absolute value of the difference between the final target engine speed Neo and the engine speed Ne falls within the set range Ns (|Neo−Ne|≤Nes), the process flow proceeds to S314 where the temporary mode determination flag Ftem is cleared (Ftem←0). Then the routine is exited.

Since the gear ratio rate of change Δi is set lower than the gear ratio rate of change to be set when the ordinary manual shift mode is intentionally returned by the driver to the automatic shift mode, it takes a longer time for the engine speed Ne to match the final target engine speed Neo. Accordingly, transition to the automatic shift mode takes a relatively long time, which allows the driver to easily recognize the cancellation of the temporary manual shift mode followed by the transition to the automatic shift mode.

Subsequently, the shift mode switching control shown in FIG. 3 is performed. Due to Ftem←0 in S203, the process flows proceeds to S205 where operation in the automatic shift mode is performed. At this time, since the driver has already recognized the transition to the automatic shift mode, a switch from the temporary manual shift mode to the auto shift mode is satisfactorily made without giving the driver a feeling of discomfort caused by a rapid change of the gear ratio.

Furthermore, a gradual change of the gear ratio i in the transition from the temporary manual shift mode to the auto shift mode results in no rapid change in driving force, ensuring a smooth transition.

Next, a specific difference in the cancellation conditions according to the present embodiment is described below with reference to timing charts in FIGS. 8 and 9.

FIG. 8 is a timing chart describing differences among first cancellation conditions to be set during normal operating conditions. FIG. 8A illustrates a temporary mode determination flag Ftem signal. FIG. 8B illustrates an engine speed Ne signal. FIG. 8C illustrates a vehicle speed V signal. FIG. 8D illustrates a back-and-forth acceleration Gx signal.

When the driver turns on the up-shift switch 36 at time t1, the shift mode is transitioned from the automatic shift mode to the temporary manual shift mode, causing the engine speed Ne to increase. As a result, the vehicle accelerates (acceleration Gx rises), and the vehicle speed V also rises.

Subsequently, the acceleration substantially comes to a stop, and the acceleration Gx decreases accordingly.

At this time, If the save mode M2 of the driving force characteristics is selected by the driver, the acceleration Gx reaches the cancellation range of the first cancellation conditions at time t2, which is the earliest time.

Thereafter (after a predetermined time Tc elapses), the cancellation conditions are satisfied at time t4 when the temporary manual shift mode is cancelled, resulting in a transition to the automatic shift mode.

If the normal mode M1 of the driving force characteristics is selected by the driver, the acceleration Gx reaches the cancellation range of the first cancellation conditions at time t3. Thereafter (after the predetermined time Tc elapses), the cancellation conditions are satisfied at time t6 when the temporary manual shift mode is cancelled, resulting in a transition to the automatic shift mode.

If the power mode M3 of the driving force characteristics is selected by the driver, the acceleration Gx reaches the cancellation range of the first cancellation conditions at time t5. Thereafter (after the predetermined time Tc elapses), the cancellation conditions are satisfied at time t7 when the temporary manual shift mode is cancelled, resulting in a transition to the automatic shift mode.

As described above, in the present embodiment the cancellation conditions for the temporary manual shift mode are most likely to satisfied in the save mode M2 of the driving force characteristics, while the cancellation conditions for the temporary manual shift mode are most unlikely to be satisfied in the power mode M3 of the driving force characteristics. Since the driver desires comfort-oriented and economy-oriented driving when selecting the save mode M2, the save mode M2 is set so as to have acceleration followed by a constant speed period between time t2 and time t4. Accordingly, returning to the automatic shift mode at an earlier time results in better fuel economy as well as a lower engine speed which makes the vehicle compartment quieter and more comfortable.

FIG. 9 is a timing chart describing differences among second cancellation conditions to be set during a transition from traveling on a curved section of a road to traveling on a straight section thereof following down-shifting. FIG. 9A illustrates a temporary mode determination flag Ftem signal. FIG. 9B illustrates an engine speed Ne signal. FIG. 9C illustrates an accelerator opening θacc signal. FIG. 9D illustrates a vehicle speed V signal. FIG. 9E illustrates a back-and-forth acceleration Gx signal.

When the driver turns on the down-shift switch 37 at time t1 before entering a corner, the shift mode is transitioned from the automatic shift mode to the temporary manual shift mode, causing the engine speed Ne to increase. As a result, engine braking is generated, causing the vehicle speed V to decrease.

Subsequently, when the driver depresses the accelerator pedal at time t2, the vehicle moves from a decelerating state to an accelerating state.

At this time, if the save mode M3 of the driving force characteristics is selected by the driver, the acceleration Gx reaches the cancellation range of the second cancellation conditions substantially at the same time as time t2, which is the earliest time. Thereafter (after the predetermined time Tc elapses), the cancellation conditions are satisfied at time t4 when the temporary manual shift mode is cancelled, resulting in a transition to the automatic shift mode.

If the normal mode M1 of the driving force characteristics is selected by the driver, the acceleration Gx reaches the cancellation range of the second cancellation conditions at time t3. Thereafter (after the predetermined time Tc elapses), the cancellation conditions are satisfied at time t6 when the temporary manual shift mode is cancelled, resulting in a transition to the automatic shift mode.

If the power mode M2 of the driving force characteristics is selected by the driver, the acceleration Gx reaches the cancellation range of the second cancellation conditions at time t5. Thereafter (after the predetermined time Tc elapses), the cancellation conditions are satisfied at time t7 when the temporary manual shift mode is cancelled, resulting in a transition to the automatic shift mode.

As described above, in the present embodiment if the vehicle is considered to be in a transition from traveling on a curved section of a road to traveling on a straight section thereof following down-shifting, the cancellation conditions for the temporary manual shift mode are most likely to satisfied in the power mode M3 of the driving force characteristics, while the cancellation conditions for the temporary manual shift mode are most unlikely to be satisfied in the save mode M2 of the driving force characteristics. Since the driver desires sport-oriented and maneuverability-oriented driving when selecting the power mode M3, the power mode M3 is set so as to return the vehicle to the automatic shift mode soon after, for example, the driver down-shifts to slow down the vehicle through engine braking before entering a corner and then depresses the accelerator pedal when exiting the corner, thereby providing a more improved accelerating performance due to down-shifting.

As described above, the shift control apparatus according to the embodiment of the present invention is configured to have cancellation conditions for the temporary manual shift mode stored in advance therein, which vary depending on the above-mentioned modes M of the driving force characteristics. The shift control apparatus selects a cancellation condition for the temporary manual shift mode which corresponds to a current mode and makes a determination as to whether such a cancellation condition is satisfied. If it is determined that the cancellation condition for the temporary manual shift mode is satisfied the shift control apparatus returns the vehicle from the temporary manual shift mode to the automatic shift mode. Accordingly, a distinct difference can be made among the driving force modes to be selected by the driver by changing driving conditions under the temporary manual shift mode according to the driving force characteristics to be selected by the driver, thereby more greatly improving convenience for the driver.

The embodiment of the present invention is described by way of an example of an apparatus operable in three driving force modes. However, the present invention is not limited to this. The present invention can be applied to apparatuses operable in two driving force modes, or four or more driving force modes.

Furthermore, the present invention can be applied to an automatic transmission other than a continuously variable transmission.

What is claimed is:

1. A vehicle shift control apparatus that is operable in a vehicle including a plurality of driving force modes in which an engine generates a driving force in response to an accelerator operation, and, as control modes of an automatic transmission connected to the engine, an automatic shift mode in which a gear ratio is automatically controlled according to predetermined shift characteristics and a temporary manual shift mode in which a gear ratio can be temporarily selected from among a plurality of predetermined fixed gear ratios through an operation of a shift switch when driving is performed in the automatic shift mode, the apparatus comprising:
    a cancellation condition storage unit that stores condition data for cancellation of the temporary manual shift mode which vary according to the plurality of modes;
    a cancellation condition determination unit that, in the temporary manual shift mode, selects cancellation conditions for the temporary manual shift mode corresponding to a current mode and makes a determination as to whether the cancellation conditions are satisfied; and
    a control unit that returns the temporary manual shift mode to the automatic shift mode when the cancellation condition determination unit determines that the cancellation conditions for the temporary manual shift mode are satisfied.

2. The vehicle shift control apparatus according to claim 1, wherein the plurality of modes includes at least a first mode that places emphasis on comfort-oriented, economy-oriented driving and a second mode that places more emphasis on sport-oriented, maneuverability-oriented driving than the first mode, and
    wherein, during driving under a predetermined normal operating condition, the cancellation conditions for the temporary manual shift mode in the first mode are more likely to be satisfied than the cancellation conditions for the temporary manual shift mode in the second mode.

3. The vehicle shift control apparatus according to claim 1, wherein the plurality of modes include at least a first mode that places emphasis on comfort-oriented, economy-oriented driving and a second mode that places more emphasis on sport-oriented, maneuverability-oriented driving than the first mode, and
    wherein, in a transition from traveling on a curved section of a road to traveling on a straight section thereof following down-shifting, the cancellation conditions for the temporary manual shift mode in the second mode are more likely to be satisfied than the cancellation conditions for the temporary manual shift mode in the first mode.

4. The vehicle shift control apparatus according to claim 1, wherein the cancellation conditions for the temporary manual shift mode are set using a parameter that determines a constant-speed operation of a vehicle.

5. The vehicle shift control apparatus according to claim 2, wherein the cancellation conditions for the temporary manual shift mode are set using a parameter that determines a constant-speed operation of a vehicle.

6. The vehicle shift control apparatus according to claim 3, wherein the cancellation conditions for the temporary manual shift mode are set using a parameter that determines a constant-speed operation of a vehicle.

7. The vehicle shift control apparatus according to claim 4, wherein the parameter comprises a vehicle back-and-forth acceleration.

8. The vehicle shift control apparatus according to claim 5, wherein the parameter comprises a vehicle back-and-forth acceleration.

9. The vehicle shift control apparatus according to claim 6, wherein the parameter comprises a vehicle back-and-forth acceleration.

10. The vehicle shift control apparatus according to claim 4, wherein the parameter comprises an accelerator opening.

11. The vehicle shift control apparatus according to claim 5, wherein the parameter comprises an accelerator opening.

12. The vehicle shift control apparatus according to claim 6 wherein the parameter comprises an accelerator opening.

13. The vehicle shift control apparatus according to claim 1, wherein the cancellation conditions are based on driving force characteristics.

14. A vehicle shift control apparatus, comprising:
    a mode selection switch unit configured to select a control mode of an automatic transmission in which a temporary manual shift mode can be selected through an operation of a shift switch;
    a cancellation condition storage unit configured to store condition data to cancel the temporary shift mode based on a selected control mode of the automatic transmission;
    a cancellation condition determination unit configured to determine if a cancellation condition is satisfied based on a cancellation condition for the temporary manual shift mode corresponding to the selected control mode; and
    a control unit configured to return the temporary manual shift mode to the automatic shift mode when the cancellation condition determination unit determines that the cancellation condition is satisfied.

15. The vehicle shift control apparatus according to claim 14, wherein the plurality of modes include at least a first mode that emphasizes on comfort-oriented, economy-oriented driving and a second mode that emphasizes on sport-oriented maneuverability-oriented driving.

16. The vehicle shift control apparatus according to claim 14, wherein the cancellation condition includes determining if a vehicle comprising the vehicle shift control apparatus is in a transition from traveling on a curved section of a road to traveling on a straight section of the road following a down-shifting operation of the shift switch.

* * * * *